United States Patent
Conti et al.

(10) Patent No.: US 8,425,213 B2
(45) Date of Patent: Apr. 23, 2013

(54) APPARATUS FOR VULCANIZATION AND MOULDING OF TYRES AND METHOD FOR MANUFACTURING THE SAME

(75) Inventors: Davide Conti, Milan (IT); Alessio Cerrano, Milan (IT); Marco Alessandro Rossi, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 21 days.

(21) Appl. No.: 12/808,643

(22) PCT Filed: Dec. 18, 2007

(86) PCT No.: PCT/IB2007/055202
§ 371 (c)(1),
(2), (4) Date: Nov. 22, 2010

(87) PCT Pub. No.: WO2009/077814
PCT Pub. Date: Jun. 25, 2009

(65) Prior Publication Data
US 2011/0056613 A1 Mar. 10, 2011

(51) Int. Cl.
*B29C 35/02* (2006.01)
(52) U.S. Cl.
USPC .................................. 425/28.1; 425/46
(58) Field of Classification Search ............. 425/28.1, 425/46, 470
See application file for complete search history.

(56) References Cited

U.S. PATENT DOCUMENTS

| | | | | |
|---|---|---|---|---|
| 2,224,337 A | * | 12/1940 | Bostwick | 29/515 |
| 2,736,924 A | * | 3/1956 | Bean | 425/28.1 |
| 4,553,918 A | * | 11/1985 | Yoda et al. | 425/46 |
| 6,827,566 B1 | | 12/2004 | Root et al. | |
| 6,896,503 B1 | | 5/2005 | Pinkawa et al. | |
| 2005/0249833 A1 | | 11/2005 | Ward | |

FOREIGN PATENT DOCUMENTS

| | | | |
|---|---|---|---|
| DE | 197 49 565 | * | 3/1999 |
| EP | 1 719 598 A1 | | 11/2006 |
| JP | 60-97811 | | 5/1985 |
| JP | 3-264308 | | 11/1991 |
| JP | 10-258429 | * | 9/1998 |
| WO | WO-03/002334 A1 | | 1/2003 |

OTHER PUBLICATIONS

International Search Report from the European Patent Office for International Application No. PCT/IB2007/055202 (Mail date: Sep. 4, 2008).

* cited by examiner

*Primary Examiner* — James Mackey
(74) *Attorney, Agent, or Firm* — Finnegan, Henderson, Farabow, Garrett & Dunner, L.L.P.

(57) ABSTRACT

In a vulcanization and moulding apparatus for tyres and a method of manufacturing the same, the apparatus includes containment walls defining an inner surface delimiting a moulding cavity. The shape of the inner surface matches the final conformation to be given to the vulcanized tyre and includes a plurality of lamellae. Each lamella comprises at least one lug inserted in a respective seat formed in the inner surface and opening on the inner surface itself. The lug and the respective seat, along an insertion direction of the lamella into the seat, are at least partly misaligned relative to the work portion. The work portion of the lamella further comprises at least one abutment surface bearing against the inner surface of the moulding cavity. The seat is closed with an addition material by laser or tungsten inert gas welding, so as to lock the lamella in the moulding apparatus.

22 Claims, 4 Drawing Sheets

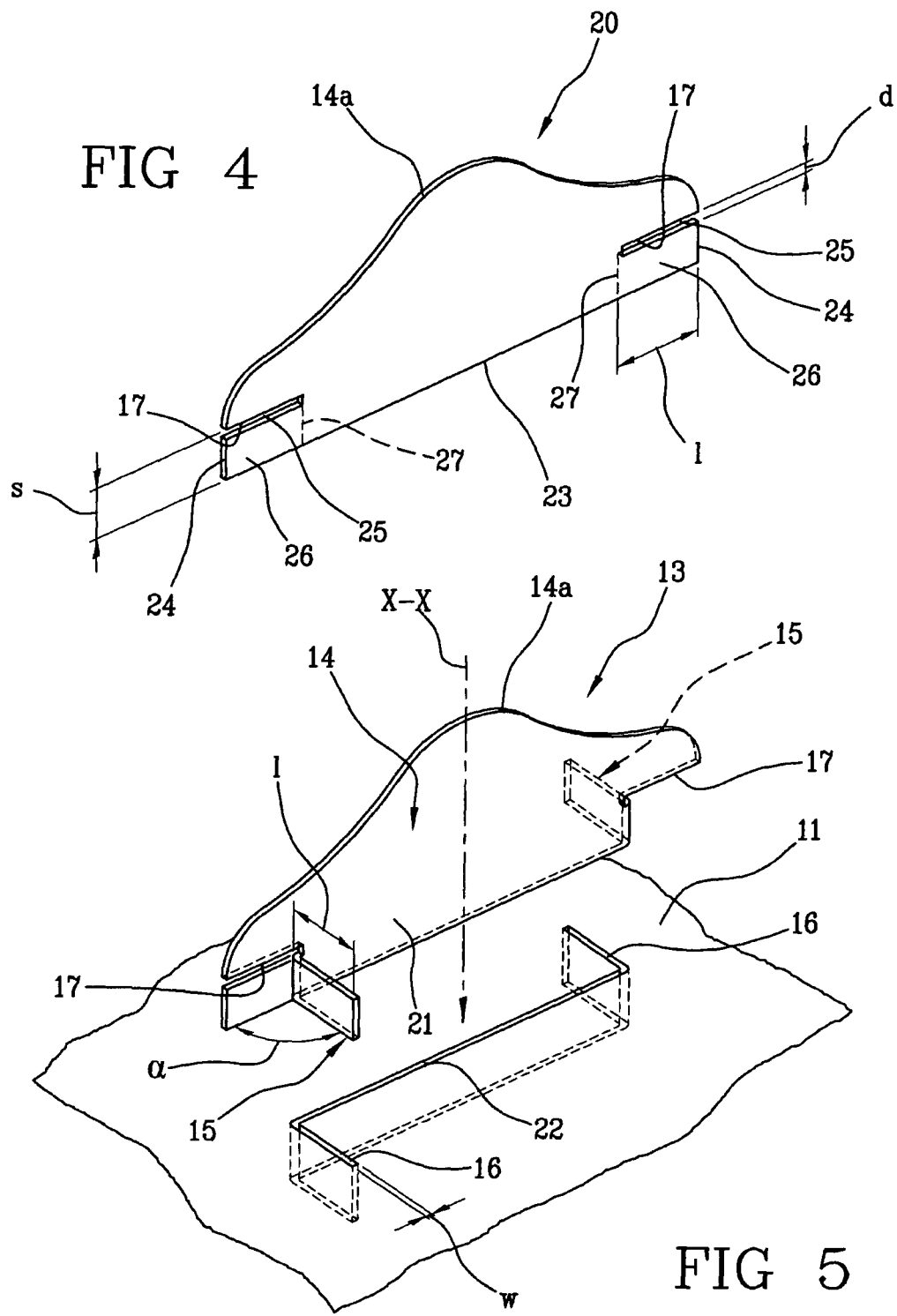

APPARATUS FOR VULCANIZATION AND MOULDING OF TYRES AND METHOD FOR MANUFACTURING THE SAME

CROSS REFERENCE TO RELATED APPLICATION

This application is a national phase application based on PCT/IB2007/055202, filed Dec. 18, 2007, the content of which is incorporated herein by reference.

BACKGROUND OF THE INVENTION

1. Field of the Invention

The present invention relates to an apparatus for vulcanisation and moulding of tyres for vehicles wheels and to a method of manufacturing said apparatus.

2. Description of the Related Art

A tyre for vehicle wheels generally comprises a carcass structure including at least one carcass ply having respectively opposite end flaps in engagement with respective annular anchoring structures integrated into the regions usually identified with the name of "beads", having an inner diameter substantially corresponding to a so-called "fitting diameter" of the tyre on a respective mounting rim.

Associated with the carcass structure is a belt structure comprising one or more belt layers disposed in radially superposed relationship relative to each other and to the carcass ply, having textile or metallic reinforcing cords with a crossed orientation and/or substantially parallel to the circumferential extension direction of the tyre. A tread band also made of an elastomeric material like other semifinished products constituting the tyre is applied to the belt structure, at a radially external position.

In addition, respective sidewalls of elastomeric material are applied at an axially external position to the side surfaces of the carcass structure, each extending from one of the side edges of the tread band until close to the respective annular anchoring structure to the beads, which sidewalls can also be made in advance, in the form of drawn or extruded section members.

Subsequently to building of the green tyre carried out by assembling respective components, a vulcanisation and moulding treatment is carried out which aims at determining the structural stabilisation of the tyre through cross-linking of the elastomeric compounds, as well as at impressing the tread band with a desired tread pattern.

The vulcanisation and moulding treatment is carried out by introducing the green tyre into a moulding cavity of a vulcanisation and moulding apparatus, which cavity has a conformation corresponding to the outer conformation to be given to the vulcanised tyre.

The green tyre, once enclosed in the apparatus, is pressed against the containment walls. Subsequently or simultaneously with the pressing step, heat is supplied to the tyre pressed against the containment walls.

By effect of pressing, suitable ridges provided on the apparatus sectors and plates give rise to formation of a desired tread pattern on the tread band of the tyre, as well as of a plurality of graphic signs on the tyre sidewalls. The supplied heat causes cross-linking of the elastomeric material of which the tyre itself is made. When the cycle has been completed, the vulcanised and moulded tyre is removed from the apparatus, after opening of same.

In tyres of the winter type the tread pattern is suitable for travelling on snow-covered surfaces as well. Of the greatest importance to the aims of the behavioural features in case of running on a snow-covered roadway is the presence of a suitable series of sipes in the blocks. i.e. of a thick series of narrow cuts or hollows disposed consecutively close to each other in a circumferential direction and oriented in a way substantially transverse to the rolling direction. The task of these sipes is substantially to efficiently receive and retain the snow, since it is known the snow-to-snow friction is greater than rubber-to-snow friction.

In order to obtain said sipes on the tread, following vulcanisation and moulding, the mould is provided with a plurality of lamellae projecting from its inner surface delimiting the moulding cavity. These lamellae extend away from the surface itself. Typically, in tyre manufacture said lamellae are produced separately from the mould and subsequently mounted thereon.

Generally however, after a few work cycles of the mould, the lamellae fastened in accordance with the known art have a tendency to detach themselves from the mould and get lost. In particular, on drawing of the tyre from the mould, after a vulcanisation and moulding step has been carried out, some of the lamellae fastened according to the known methods come off the mould, and remain entrapped in the elastomeric material of the tread and/or fall to the ground.

U.S. Pat. No. 6,827,566B1 shows a self-locking lamella used in moulds for tyres. An end portion of the lamella is inserted into a slit in the mould and a main portion of same extends from the slit so as to form a narrow cut in the tyre. A wing, or a pair of wings, attached to said end portion is received in a hollow in the slit and a wedge belonging to the wing itself is able to force the wing to a locked condition while the lamella is being fitted into the slit. A thin frangible portion or a pair of frangible portions keep the wedge attached to the wind and break to enable movement of the wedge and obtain locking when the lamella is being fitted in the slit. Alternatively, the wedge is previously positioned in a housing in the hollow and the wing portions move to the locked condition when they come into contact with said wedge.

Document EP1719598A1 shows a method of fastening a lamella to a mould for tyres. A groove is formed in the mould. In a transverse section, the groove has a straight guide portion facing up on the inner surface of the mould as well as a portion of greater width formed more deeply and connected to the guide portion by a step. The lamella at one end designed to be inserted into the groove has a bent portion that when the lamella is pushed into the portion of greater width, is snap engaged with the step.

Patent JP60097811 discloses a mould for tyres comprising a ring mounted within a support body of the mould, which ring has a shape matching that of the tyre to be vulcanised and moulded, and a plurality of lamellae. The ring is provided with through openings having different shapes and the lamellae are each inserted and welded in a respective through opening. The ring is installed on the support body through bolts.

SUMMARY OF THE INVENTION

The Applicant has noticed that the fastening methods of the known art, in addition to being unable to ensure locking of the lamella onto the mould for an important part of the lifetime of the mould itself, are also complicated and therefore expensive. In fact, due to the structure of each individual lamella of known type, difficult working operations are to be executed both on the inner wall of the mould in order to form suitable seats, and on the portions of the lamellae suitable for engagement in said seats.

The Applicant has also noticed that the fastening methods of the known art do not allow the correct extension of the lamellae beyond the inner surface of the mould to be set in a precise and repeatable manner and, as a result, also the depth of the narrow cuts or sipes made on the tyre tread cannot be accurate and of sure repetition. In particular, the Applicant has observed that known lamellae all rest on an inner surface of the seat in which they are installed and, therefore, the amount of the lamella portion projecting from the mould surface depends on the precise working of said seat. On the other hand, working of said seat so as to obtain close, tolerances is difficult and expensive and adversely affects the production costs of the mould.

Therefore, the Applicant has examined the problem of efficiently connecting each lamella to the mould in such a manner that the lamella does not separate therefrom during an important part of the useful life of the mould itself, but without introducing complications in the production process of the mould.

The Applicant has also examined the problem of ensuring the correct positioning of each lamella in order to enable it to project from the mould surface by a predetermined correct amount.

In accordance with the present invention, the Applicant has found that by making each lamella in such a manner that it has an abutment surface designed to bear against the inner surface of the mould and at least one lug or tab adapted to be inserted and locked by means of addition material into a respective seat formed in said inner surface, it is possible to simultaneously ensure safe locking of the lamella and correct height of same.

More specifically, according to a first aspect the present invention relates to a vulcanisation and moulding apparatus comprising:
  containment walls including an inner surface defining a moulding cavity, the shape of said inner surface matching the final conformation to be given to the vulcanised tyre, and
  a plurality of lamellae having work portions projecting from said inner surface and adapted to form corresponding lamellar cuts or sipes on the vulcanised tyre;
  wherein at least one of said lamellae comprises at least one lug or tab inserted in a respective seat formed in the inner surface and opening on said inner surface, said lug and respective seat being at least partly misaligned relative to the work portion, along an insertion direction of the lamella in the seat;
  wherein said seat is closed with an addition material; and
  wherein the work portion of the lamella comprises at least one abutment surface bearing against the inner surface defining the moulding cavity.

According to a further aspect, the present invention relates to a method of manufacturing a vulcanisation and moulding apparatus for tyres, comprising the steps of:
  providing containment walls comprising an inner surface defining a moulding cavity, the shape of said inner surface matching the final conformation to be given to the vulcanised tyre;
  forming seats in the inner surface;
  providing lamellae, each having a work portion adapted to project from the inner surface and at least one lug;
  inserting the lug of each lamella into a respective seat and bringing at least one abutment surface of said work portion to bear against the inner surface of the moulding cavity;
  laying addition material on said at least one lug inserted in the seat for locking the lamella.

The correct measure of the lamella height is obtained in a precise manner through working of the abutment surface belonging to the outer work portion of the lamella and of the inner surface of the mould, without being obliged to operate with close tolerances at the inside of the slit housing an engagement portion of the lamella itself. In fact said engagement portion has not to about against the slit bottom.

In addition, when the lamella is mounted in the respective slit and before locking of same, the lug or lugs keeps/keep well visible at the sides of the work portion and can be easily reached by suitable tools adapted to lay the addition material thereon.

The present invention, in at least one of said aspects, can further have one or more of the preferred features hereinafter described.

Preferably, said at least one lug lies in a recessed position relative to the inner surface and together with the seat delimits a laying cavity for the addition material. The cavity allows a sufficient amount of addition material to be laid so as to ensure steady locking without this material generating protuberances on the inner surface of the mould. These protuberances would produce corresponding recesses on the tyre tread. In fact, after laying of the material, a smoothing action can be carried out on the region with the addition material.

To allow formation of said cavity, preferably said abutment surface is spaced apart from said at least one lug by a distance measured along the insertion direction.

Said distance is the depth of the laying cavity.

Preferably, said distance is greater than or equal to about 0.3 mm.

In addition, said distance is smaller then or equal to about 1.2 mm.

More preferably, said distance is greater than or equal to about 0.5 mm.

Therefore, when the abutment surface comes into contact with the mould, the lug inserted in the seat is in a recessed position relative to the inner surface.

Preferably, said at least one lug extends along a direction orthogonal to the insertion direction over a length greater than or equal to about 2 mm.

In addition, said at least one lug can extend along a direction orthogonal to the insertion direction over a length smaller than or equal to about 10 mm.

The greater the length of the lug is, the greater the steadiness of the lamella and the ease of laying the addition material.

In a preferred embodiment said seat is a slit and the lug has a laminar shape.

Preferably, said slit has a width greater than or equal to about 0.3 mm;

In addition, said slit can have a width smaller than or equal to about 1.2 mm.

By limiting the slit width it is possible to limit the amount of laid material and, consequently, the cost for this material and for the process used for laying it down.

According to a preferred embodiment, said lamella comprises two lugs positioned on opposite sides of the lamella.

Anchoring on opposite sides ensures a more efficient locking and a greater steadiness of the lamella.

In accordance with a preferred embodiment, said lamella comprises a portion for engagement with the inner surface inserted in a respective groove formed in the inner surface and opening on said inner surface, said engagement portion and respective groove being aligned relative to the work portion, along an insertion direction of the lamella in the seat.

The lamella is located in the mould surface not only at the lug or lugs, but also at an engagement portion aligned with the work portion.

In addition, said at least one lug extends starting from the engagement portion.

Preferably, the groove and seat are defined by a single cut.

Working of the inner surface of the mould is simple, as the milling cutter therein used must trace a single furrow.

Preferably, the engagement portion extends away from the abutment surface along the insertion direction over a distance greater than or equal to about 2 mm.

In addition, the engagement portion can extend away from the abutment surface along the insertion direction over a distance smaller than or equal to about 4 mm.

In addition, preferably, the lamella consists of a cut off and bent sheet metal. Therefore, manufacture of the lamellae according to the invention is simple, quick and cheap.

Preferably the lamella is made of steel.

The lamella is very strong and does not bend or break under the pressure exerted by the elastomeric material during vulcanisation/moulding.

In addition, preferably, the containment walls are made of aluminium. Since aluminium can be easily worked, the moulds can be made more quickly and in a more precise manner. Furthermore, the thermal conductivity of aluminium positively affects the vulcanisation process.

According to a preferred embodiment, the addition material consists of metal material.

Preferably the addition material is aluminium.

By adopting metallic addition material covering the lugs, the lamellae made of steel can be safely joined to the mould made of aluminium even if the two materials (aluminium and steel) cannot be joined together by a traditional welding process.

Preferably, the step of inserting said at least one lug comprises the step of bringing said at least one lug to a recessed position relative to the inner surface, so as to delimit, together with the seat, a laying cavity for the addition material.

According to a preferred embodiment of the method, the step of providing each lamella comprises the steps of cutting off a shaped portion from a sheet metal and bending at least one part of said shaped portion to form said at least one lug.

Preferably, the step of providing each lamella comprises the steps of cutting off a shaped portion from a sheet metal and bending two parts of said shaped portion to form two mutually spaced apart lugs.

In addition, preferably, the two parts are bent towards opposite surfaces of said shaped portion.

Therefore, very stable lamellae can be constructed in a simple, quick and cheap manner.

Preferably, said part of said shaped portion is bent according to an angle greater than or equal to about 45°.

In addition, said part of said shaped portion is bent according to an angle smaller than or equal to about 135°.

The angle is such selected as to space apart the lug from other parts of the lamella as much as possible, so as to minimise the thermal interference between the different steel portions during laying of the addition material.

According to a preferred embodiment of the lamella, the cutting-off step comprises the step of making at least one recess in the shaped portion in order to define said at least one part and said at least one abutment surface; the part and abutment surface being spaced apart by a distance measured along an insertion direction of the lamella into the seat.

By a single, quick and simple cutting-off operation it is therefore possible to make the lamella and the lugs spaced apart in a correct manner.

According to a preferred embodiment, the method contemplates the seat being made in the form of a slit.

According to a preferred embodiment of the method, laying of the addition material is made by laser welding.

Alternatively, laying of the addition material is obtained by TIG (Tungsten Inert Gas) welding.

Laser welding gives optimal results while TIG welding is cheaper.

In addition, the addition material is a metal material.

Preferably, the addition material is aluminium.

According to a preferred embodiment of the process, for each lamella in the containment walls of the moulding apparatus a substantially Z-shaped cut is made the final ends of which define two of said seats.

Further features and advantages will become more apparent from the detailed description of a preferred but not exclusive embodiment of a vulcanisation and moulding apparatus for tyres and of a method of manufacturing such an apparatus, in accordance with the present invention.

BRIEF DESCRIPTION OF THE DRAWINGS

This description will be set out hereinafter with reference to the accompanying drawings, given by way of non-limiting example, in which:

FIG. 4 is a perspective view of the lamella seen in FIGS. 2 and 3 during a working step of the method of the invention;

FIG. 5 is a perspective view of the lamella seen in FIG. 4 during a subsequent working step;

DETAILED DESCRIPTION OF THE INVENTION

With reference to the drawings, a vulcanisation and moulding apparatus for tyres for vehicle wheels in accordance with the present invention has been generally denoted at 1.

The vulcanisation and moulding apparatus is part of a plant for manufacturing tyres for vehicle wheels, which generally comprises devices adapted to form a green tyre 2 and devices capable of transferring the green tyre 2 into a moulding cavity 3 of apparatus 1. The moulding cavity 3 has a conformation corresponding to the outer conformation to be given to the vulcanised tyre 2. Said tyre-forming and transferring devices are not shown and are not further described as they can be made in any convenient manner.

Figure 1:
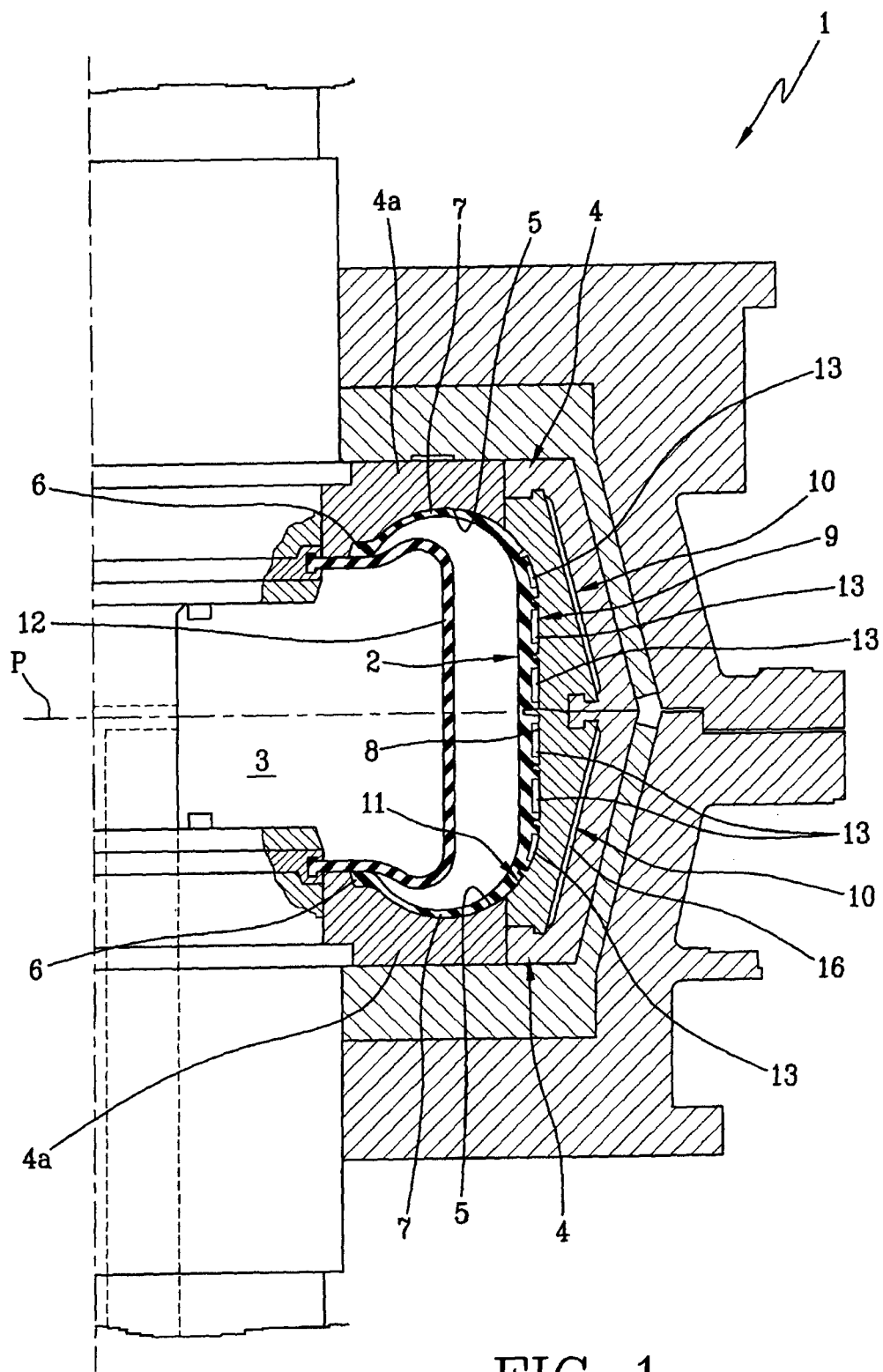
FIG. 1 diagrammatically shows a diametrical section of a portion of a vulcanisation and moulding apparatus for tyres according to the present invention.

As shown in FIG. 1, apparatus 1 has a pair of axially opposite shells 4 that can be mutually coupled at an equatorial plane "P". Shells 4 each comprise a work surface 5 designed to operate on the beads 6 and sidewalls 7 of a green tyre 2 to be vulcanised.

Shells 4 disposed mutually close to each other in said equatorial plane "P" further define a circumferential surface 8 designed to operate against a tread band 9 of tyre 2 to be vulcanised.

In the non-limiting embodiment shown, apparatus 1 is of the type consisting of sectors.

Each of the two shells 4 comprises a plate 4a carrying the work surface 5 and a plurality of circumferential sectors 10 that can be separated from plate 4a and carry half of the circumferential portion 8. When the apparatus has been closed, the circumferential sectors 10 together with plates 4a define containment walls of the moulding cavity 3.

According to an alternative embodiment not shown, apparatus 1 is of the type made up of two halves, i.e. each of shells 4 consists of a single body and therefore defines one half of apparatus 1. An inner surface of each of the two shells 4 comprises the work surface 5, designed to operate on the beads 6 and sidewalls 7 of the green tyre 2 to be vulcanised, and half of the circumferential portion 8 operating on the tread band 9 or tyre crown.

Irrespective of the fact that apparatus 1 is made up of sectors or consists of two halves, the containment walls 4a, 10 comprise an inner surface 11 defining a moulding cavity 3 the shape of which matches the final conformation to be given to tyre 2. The containment walls 4a, 10 are made of aluminium or steel.

The green tyre 2, once enclosed in apparatus 1, is pressed against the containment walls 4a, 10 by a suitable device 12 defined by a bladder for example. Subsequently or simultaneously with the pressing step, heat is supplied to tyre 2 pressed against the containment walls 4a, 10.

By effect of pressing, suitable ridges provided on shells 4 cause formation of a desired tread pattern on the tread band 9 of tyre 2, as well as possibly formation of graphic signs on the sidewalls 7 of the tyre 2 itself. The supplied heat causes cross-linking of the elastomeric material of which tyre 2 is made. When the cycle has been completed, the vulcanised and moulded tyre 2 is removed from apparatus 1 after opening of the latter.

As shown in FIG. 1, the vulcanisation and moulding apparatus 1 further comprises a plurality of lamellae 13 preferably made of steel (AISI 304, AISI 410 or AISI 420, for example). Each lamella 13, as better shown in FIG. 2, has a work portion projecting from the inner surface 11 and is adapted to form a corresponding lamellar cut or sipe on the vulcanised tyre 2. Preferably, the work portion 14 lies in one or more planes orthogonal to the inner surface 11.

The sipes are preferably disposed consecutively close to each other in a circumferential direction and oriented substantially transverse to the rolling direction. The task of these sipes is substantially to efficiently receive and retain the snow during rolling of the tyre, since it is known that snow-to-snow friction is greater than rubber-to-snow friction.

In the apparatus shown in FIG. 1, the lamellae 13 are disposed in circumferential parallel rows. The lamellae 13 of each row are arranged consecutively close to each other in a circumferential direction and oriented in a way substantially transverse to the equatorial plane "P". In particular, FIG. 1 shows the lamellae 13 of all circumferential rows visible in a radial section of apparatus 1, each of said lamellae 13 being disposed in a respective block of tyre 2.

The lamellae 13 shown in FIGS. 1 to 5 have a work portion 14 lying in a single plane and a curvilinear work edge 14a. In an alternative embodiment shown in FIG. 6, the lamella 13 has a work portion 14 with a saw-toothed course. Each lamella 13 preferably has a thickness "t" included between about 0.5 mm and about 1 mm.

The shape and sizes of the work portions 14 and the position of lamellae 13 on the inner surface 11 of apparatus 1 are not in any case restrictive.

Each lamella 13 according to the invention further comprises at least one lug or tab 15 which is inserted into a respective seat 16. Seat 16 is formed in the inner surface 11 of apparatus 1 and opens on said inner surface 11. The function of lug 15 is locking of lamella 13, as described in more detail below.

When the lamella 13 is installed, lug 15 and the respective seat 16 in which lug 15 is inserted, are at least partly misaligned relative to the work portion 14. This misalignment is measured reference being made to an insertion direction "X-X" of lamella 13 in seat 16. This direction "X-X" corresponds to the extension in depth of seat 16 and is preferably orthogonal to the inner surface 11 in the insertion region.

Therefore, when the lamella 13 has been installed, any part of the work portion 14 is neither disposed over nor does it cover lug 15 and the respective seat 16 or at least part of them.

The work portion 14 of lamella 13 further has an abutment surface 17 which, when the lamella 13 has been installed and lug 15 has been inserted into seat 16, bears against the inner surface 11 of the moulding cavity 3 without fitting into said seat 16.

The abutment surface 17 is spaced apart from lug 15 by a distance "d" measured along the insertion direction "X-X", so that, once it has been brought into contact with the abutment surface 17 against the inner surface 11, lug 15 lies in a recessed position relative to said inner surface 11 and together with seat 16 delimits a laying cavity 18. In particular, the laying cavity 18 is delimited by side walls of seat 16 and by the edge of lug 15 which is the closest to the inner surface 11. Said distance "d" is therefore the depth of the laying cavity 18.

Preferably, distance "d" is included between about 0.3 mm and about 1.2 mm, more preferably between about 0.5 mm and about 1 mm.

Figure 2:
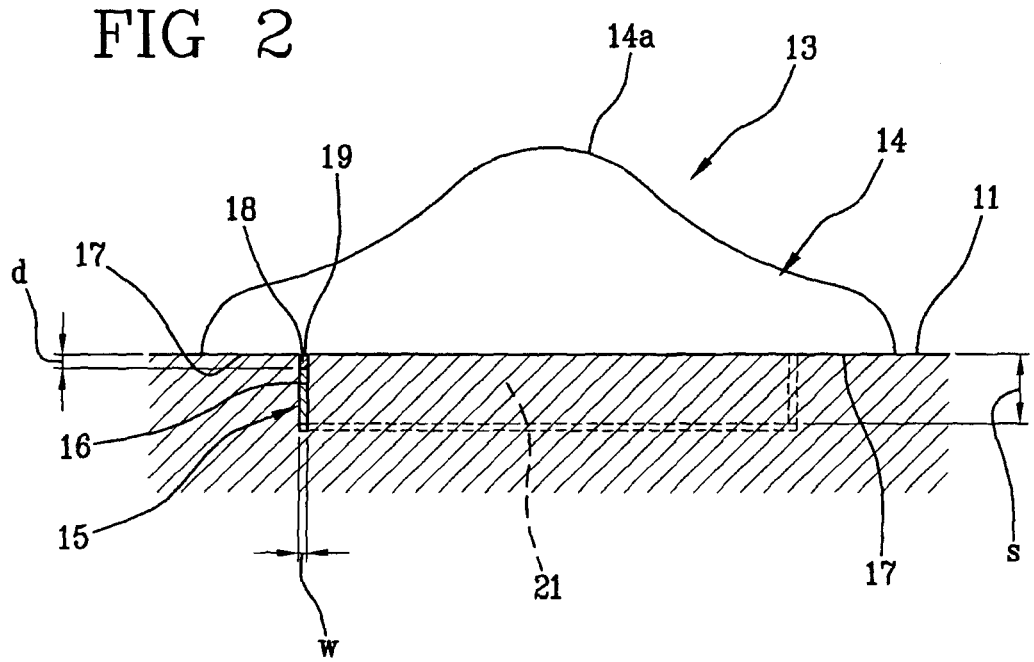
FIG. 2 is a diametrical section of a portion of a shell of the apparatus seen in FIG. 1 at a lamella in accordance with the invention.
Figure 3:
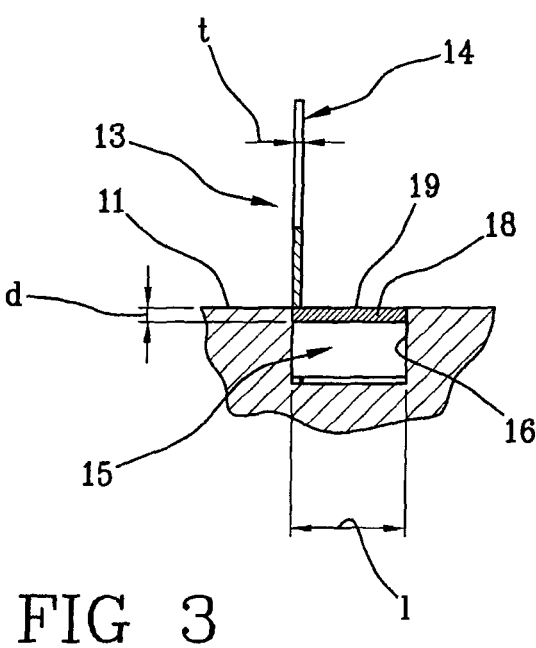
FIG. 3 is a side view partly in section of the lamella seen, in FIG. 2.

An addition material 19, preferably a metal material, is laid in the laying cavity 18 and it closes seat 16 being used to fasten lamella 13 to apparatus 1 (FIGS. 2 and 3). The addition material 19 is preferably aluminium, more preferably a low-silicon content aluminium alloy (less than 5%). The metallic addition material 19 is laid by laser welding or TIG (Tungsten Inert Gas) welding.

In the non-limiting embodiments shown, the lamella 13 is formed from sheet steel cut off and bent so as to define a shaped portion 20.

In the embodiment shown in FIGS. 1 to 5, the work portion 14 of lamella 13 lies in a single plane. Lamella 13 further has an engagement portion 21 extending without a break from the work portion 14 and lying in the same plane as the latter.

The engagement portion 21 is inserted into a respective groove 22 formed in the inner surface 11 and opening on said inner surface 11, in the same manner as seat 16. The engagement portion 21 and respective groove 22 are therefore aligned relative to the work portion 14 along the insertion direction "X-X" of lamella 13 into seat 16. Therefore, when lamella 13 has been installed, the work portion is disposed above the engagement portion 21 and respective groove 22.

Extending from opposite ends of the engagement portion 21 are two mutually spaced apart laminar lugs 15 entering two seats 16 each defined by a respective slit. Preferably, said slits 16 each have a width "w" included between about 0.3 mm and about 1.2 mm, more preferably included between about 0.5 mm and about 1 mm.

In accordance with what shown, the two lugs 15 are orthogonal to the lying plane common to the work portion 14 and engagement portion 21 and, therefore also to the insertion direction "X-X".

In addition; the two lugs 15 extend in mutually opposite directions, i.e. on opposite sides of the lamella 13. Preferably, lugs 15 each extend along said direction orthogonal to the insertion direction "X-X" over a length "l" included between about 2 mm and about 3 mm and 10 mm, more preferably included between about 3 mm and about 5 mm.

As a consequence of the geometry of lamella 13 shown in FIGS. 1 to 5, a single cut formed in the inner surface 11 of the moulding cavity 3, by milling for example, defines both groove 22 and the two slits 16 extending from opposite ends of said groove 22 and in opposite ways. As shown in FIG. 5, cut 16, 22 has a substantially Z-shaped conformation.

In the vicinity of the two lugs 15, the work portion 14 further has two abutment surfaces 17. The engagement portion 21 extends away from the abutment surfaces 17 along the insertion direction "X-X" over a distance "s" preferably included between about 2 mm and about 4 mm, more preferably between about 2.5 mm and about 3 mm.

Irrespective of the amount of said distance "s", the depth of cut 16, 22 is of such a nature that, when the lamella 13 has been installed, the abutment surfaces 17 bearing on the inner surface 11, rugs 15 being inserted in slits 16 and the engagement portion 21 being housed in groove 22, said lugs 15 and the engagement portion 21 are not in contact with the bottom of cut 16, 22.

In order to make the lamella 13 in FIGS. 1-5, the metal sheet is first cut off forming the shaped portion 20 in FIG. 4. In this shaped portion 20 there is a curvilinear work edge 14a, a rectilinear engagement edge 23 opposite to the work edge 14a and two rectilinear opposite sides 24 which connect the engagement edge 23 to the work edge 14a and are perpendicular to said engagement edge 23.

Two rectangular recesses are formed on said opposite sides 24, which recesses separate the work portion 14 from the engagement portion 21, delimit respective rectangular parts 26 of the shaped portion 20 and define respective rectilinear abutment surfaces 17. The abutment surfaces 17 are defined in the thickness of the lamella 13, are aligned with each other and parallel to the engagement edge 23.

The width of each of said recesses 25 measured along the insertion direction "X-X", that in this case is orthogonal to the engagement edge 23, is equal to said distance "d" and to the depth of the laying cavity 18. The length "1" of each of said parts 26 measured in an orthogonal direction to the insertion direction "X-X" is substantially the same as the length "1" of lugs 15. Each of the abutment surfaces 17 is spaced apart from the engagement edge 23 of the shaped portion 20 by a distance equal to the above mentioned distance "s".

The parts 26 are subsequently bent around bending lines 27 perpendicular to the abutment surfaces 17 towards opposite sides of the shaped portion 20 (FIG. 5). In the embodiment shown, the bending angle "α" is equal to about 90°. Preferably, this angle "α" is included between about 45° and about 135°, more preferably between about 70° and about 105°.

Figure 6:
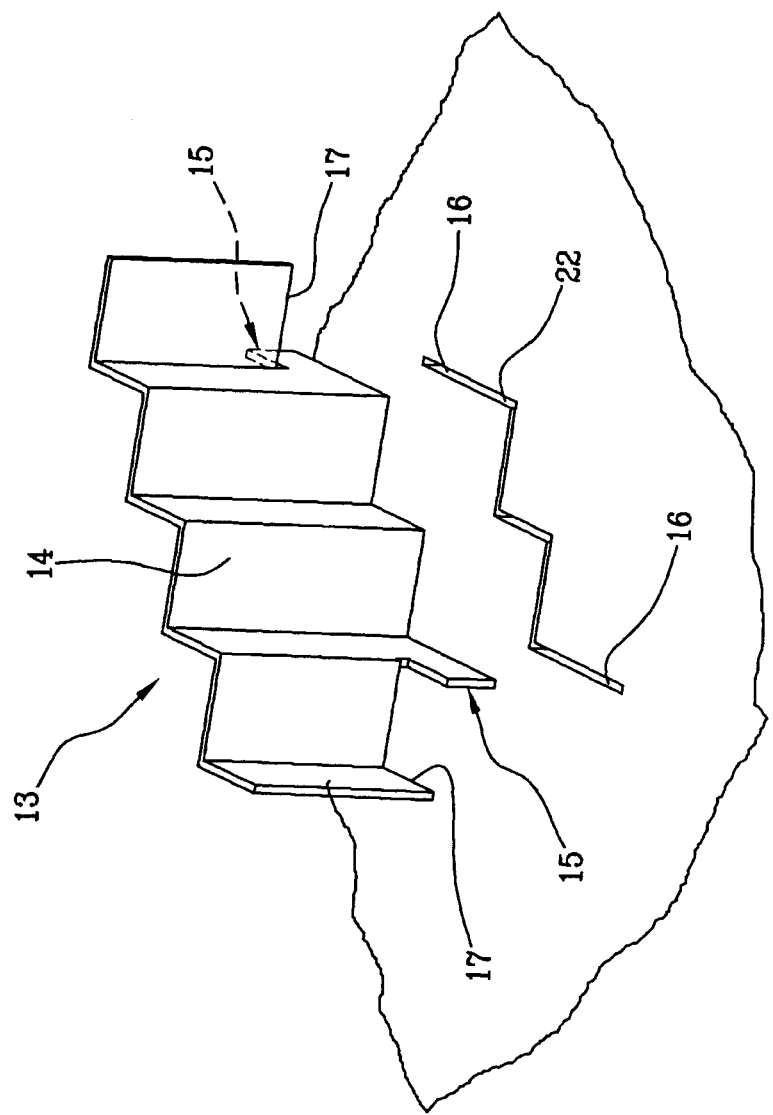
FIG. 6 is a perspective view of an alternative embodiment of the lamella in accordance with the invention.

In the alternative embodiment in FIG. 6, the cut-off shaped portion is such bent as to enable the work portion 14 to take a saw-toothed pleated shape so as to form lugs 15 and the abutment surfaces 17. Likewise, cut 16, 22 has a saw-toothed extension along the inner surface 11.

After execution of a plurality of cuts 16, 22 and a plurality of lamellae 13, each lamella 13 is housed in a respective cut 16, 22 and locked therein through laying of the addition material 19 in the laying cavities 18 delimited by seats 16 and lugs 15 housed therein.

After laying, the laying regions are submitted to manual smoothing, with milling minicutters or sand paper, for example.

The invention claimed is:

1. A vulcanisation and moulding apparatus for a tyre comprising:

containment walls comprising an inner surface defining a moulding cavity, the shape of said inner surface matching a final conformation to be given to a vulcanised tyre; and a plurality of lamellae having work portions projecting from said inner surface and capable of being adapted to form corresponding lamellar cuts or sipes on the vulcanised tyre, wherein at least one of said lamellae comprises at least one lug or tab inserted in a respective seat formed in the inner surface and opening on said inner surface, said lug and the respective seat being at least partly misaligned relative to the work portion along an insertion direction of the lamella in the seat, wherein said seat is closed with an addition material, and wherein the work portion of the lamella comprises at least one abutment surface bearing against the inner surface defining a moulding cavity, wherein said lamella comprises a portion for engagement with the inner surface inserted in a respective groove formed in the inner surface, and wherein said at least one lug or tab and the engagement portion are not in contact with a bottom of the respective seat and groove.

2. The apparatus as claimed in claim 1, wherein said at least one lug lies in a recessed position relative to the inner surface and together with the seat delimits a laying cavity for said addition material.

3. The apparatus as claimed in claim 1, wherein said abutment surface is spaced apart from said at least one lug by a distance measured along the insertion direction.

4. The apparatus as claimed in claim 3, wherein said at least one lug lies in a recessed position relative to the inner surface and together with the seat delimits a laying cavity for said addition material and wherein said distance is a depth of the laying cavity.

5. The apparatus as claimed in claim 3, wherein said distance is greater than or equal to about 0.3 mm.

6. The apparatus as claimed in claim 3, wherein said distance is less than or equal to about 1.2 mm.

7. The apparatus as claimed in claim 1, wherein said at least one lug extends along a direction orthogonal to the insertion direction over a length greater than or equal to about 2 mm.

8. The apparatus as claimed in claim 1, wherein said at least one lug extends along a direction orthogonal to the insertion direction over a length less than or equal to about 10 mm.

9. The apparatus as claimed in claim 3, wherein said seat is a slit and the lug has a laminar shape.

10. The apparatus as claimed in claim 9, wherein said slit has a width greater than or equal to about 0.3 mm.

11. The apparatus as claimed in claim 9, wherein said slit has a width less than or equal to about 1.2 mm.

12. The apparatus as claimed in claim 1, wherein said lamella comprises two lugs positioned on opposite sides of the lamella.

13. The apparatus as claimed in claim 1, wherein said lamella comprises an engagement portion for engagement with the inner surface inserted in a respective groove formed in the inner surface and opening on said inner surface, said engagement portion and respective groove being aligned relative to the work portion along said insertion direction of the lamella into the seat.

14. The apparatus as claimed in claim 13, wherein said at least one lug extends starting from the engagement portion.

15. The apparatus as claimed in claim 13, wherein the groove and the seat are defined by a single cut.

16. The apparatus as claimed in claim 13, wherein the engagement portion extends away from the abutment surface along the insertion direction over a distance greater than or equal to about 2 mm.

17. The apparatus as claimed in claim 13, wherein the engagement portion extends away from the abutment surface along the insertion direction over a distance smaller than or equal to about 4 mm.

18. The apparatus as claimed in claim 1, wherein the lamella comprises a cut-off and bent sheet metal.

19. The apparatus as claimed in claim 1, wherein the lamella is made of steel.

20. The apparatus as claimed in claim 1, wherein the containment walls are made of aluminium.

21. The apparatus as claimed in claim 1, wherein the addition material comprises metal material.

22. The apparatus as claimed in claim 1, wherein the addition material is aluminium.

* * * * *